United States Patent
Swift et al.

(10) Patent No.: US 10,100,667 B2
(45) Date of Patent: Oct. 16, 2018

(54) AXIAL FLOWING COOLING PASSAGES FOR GAS TURBINE ENGINE COMPONENTS

(71) Applicant: UNITED TECHNOLOGIES CORPORATION, Hartford, CT (US)

(72) Inventors: Anthony B. Swift, North Waterboro, ME (US); Paul M. Lutjen, Kennebunkport, ME (US); Neil L. Tatman, Brentwood, NH (US); Dominic J. Mongillo, Jr., West Hartford, CT (US); Matthew A. Devore, Rocky Hill, CT (US); Ken F. Blaney, Middleton, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 14/997,315

(22) Filed: Jan. 15, 2016

(65) Prior Publication Data

US 2017/0204742 A1    Jul. 20, 2017

(51) Int. Cl.
| | | |
|---|---|---|
| *F01D 25/12* | (2006.01) | |
| *F01D 11/08* | (2006.01) | |
| *F01D 25/24* | (2006.01) | |

(52) U.S. Cl.
CPC .............. *F01D 25/12* (2013.01); *F01D 11/08* (2013.01); *F01D 25/246* (2013.01); *F05D 2220/32* (2013.01); *F05D 2240/11* (2013.01); *F05D 2240/81* (2013.01); *F05D 2260/202* (2013.01); *F05D 2260/204* (2013.01)

(58) Field of Classification Search
CPC ........ F01D 25/12; F01D 11/08; F01D 25/246; F05D 2220/32; F05D 2240/11; F05D 2240/81; F05D 2260/202; F05D 2260/204
See application file for complete search history.

(56) References Cited

U.S. PATENT DOCUMENTS

| | | | | |
|---|---|---|---|---|
| 4,679,981 A | * | 7/1987 | Guibert | .................. F01D 11/08 415/116 |
| 5,048,288 A | * | 9/1991 | Bessette | .................. F01D 11/24 415/116 |
| 7,665,962 B1 | | 2/2010 | Liang | |
| 2015/0007581 A1 | | 1/2015 | Sezer et al. | |

FOREIGN PATENT DOCUMENTS

| | | |
|---|---|---|
| EP | 1775425 | 4/2007 |
| EP | 2549063 | 1/2013 |

OTHER PUBLICATIONS

Extended European Search Report dated May 4, 2017 in European Application No. 16198829.0.

* cited by examiner

*Primary Examiner* — Logan Kraft
*Assistant Examiner* — Justin A Pruitt
(74) *Attorney, Agent, or Firm* — Snell & Wilmer, L.L.P.

(57) ABSTRACT

A gas turbine engine component is provided. The gas turbine engine component comprises a main body and a leading edge cooling passage defined within the main body. The main body has a leading edge and a leading edge wall including an elongated transition portion extending between the leading edge and a proximate flowpath surface of the main body. The leading edge cooling passage comprises an axial flow cooling passage defined within the main body and adjacent to the leading edge wall and has a leading edge periphery that generally conforms to the elongated transition portion of the leading edge wall.

20 Claims, 8 Drawing Sheets

AXIAL FLOWING COOLING PASSAGES FOR GAS TURBINE ENGINE COMPONENTS

GOVERNMENT LICENSE RIGHTS

This disclosure was made with government support under Contract No. FA8650-09-D-2923 0021 awarded by the United States Air Force. The government has certain rights in the disclosure.

BACKGROUND

Gas turbine engines, and other turbomachines, include multiple sections, such as a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

A blade outer air seal (BOAS) array includes blade outer air seals (BOAS) segments circumferentially disposed about at least a portion of the airfoil arrays. As known, the blade outer air seal environment is exposed to temperature extremes and other harsh environmental conditions, which may affect the integrity of the blade outer air seal segments. Thus, effective cooling is typically desired to protect the BOAS array/segments.

SUMMARY

A gas turbine engine component is provided, in accordance with various embodiments. The gas turbine engine component comprises a main body and a leading edge cooling passage comprising an axial flow cooling passage defined within the main body. The main body has a leading edge and a leading edge wall including an elongated transition portion extending between the leading edge and a proximate flowpath surface of the main body. The leading edge cooling passage is adjacent to the leading edge wall and has a leading edge periphery that generally conforms to the elongated transition portion of the leading edge wall.

A blade outer air seal segment is provided for a gas turbine engine, in accordance with various embodiments. The blade outer air seal segment comprises a main body and a leading edge cooling passage comprising an axial flow cooling passage defined within the main body. The main body extends generally axially with respect to a central axis from a leading edge portion of the main body to a trailing edge portion of the main body. The leading edge portion includes a leading edge wall having an elongated transition portion and a cooling hole. The leading edge cooling passage is adjacent to the leading edge wall and has a leading edge periphery that generally conforms to the elongated transition portion of the leading edge wall.

A gas turbine engine is provided comprising a blade stage and a circumferential array of blade outer air seal segments in the blade stage, in accordance with various embodiments. The blade outer air seal segment comprises a main body and a leading edge cooling passage comprising an axial flow cooling passage defined within the main body. The main body extends generally axially with respect to a central axis from a leading edge portion of the main body to a trailing edge portion of the main body. The leading edge portion includes a cooling hole, a leading edge, and a leading edge wall having an elongated transition portion extending between the leading edge and an inner diameter flowpath surface of the main body. The leading edge cooling passage is adjacent to the leading edge wall and has a leading edge periphery that generally conforms to the elongated transition portion of the leading edge wall.

In any of the foregoing embodiments, the leading edge cooling passage has a leading edge cooling passage inlet aft of a leading edge cooling passage outlet. The leading edge cooling passage outlet communicates with the cooling hole. A cooling flow through the gas turbine engine component (BOAS segment) comprises an axial cooling flow in a forward direction toward the leading edge wall. The cooling hole comprises a film cooling hole that is disposed in the elongated transition portion of the leading edge wall. The leading edge cooling passage outlet communicating with the film cooling hole disposed in the elongated transition portion of the leading edge wall provides film cooling of the leading edge portion of the main body. Convective cooling occurs within the leading edge cooling passage, in addition to the film cooling. The leading edge periphery of the leading edge cooling passage is configured to substantially maintain a constant distance between the leading edge wall and the leading edge cooling passage. The main body and the leading edge cooling passage are that of a blade outer air seal (BOAS) segment comprising the gas turbine engine component. The leading edge cooling passage has a leading edge cooling passage inlet forward of a leading edge cooling passage outlet that communicates with the cooling hole. A cooling flow through the gas turbine engine component comprises an axial cooling flow in an aft direction away from the leading edge wall.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural. The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
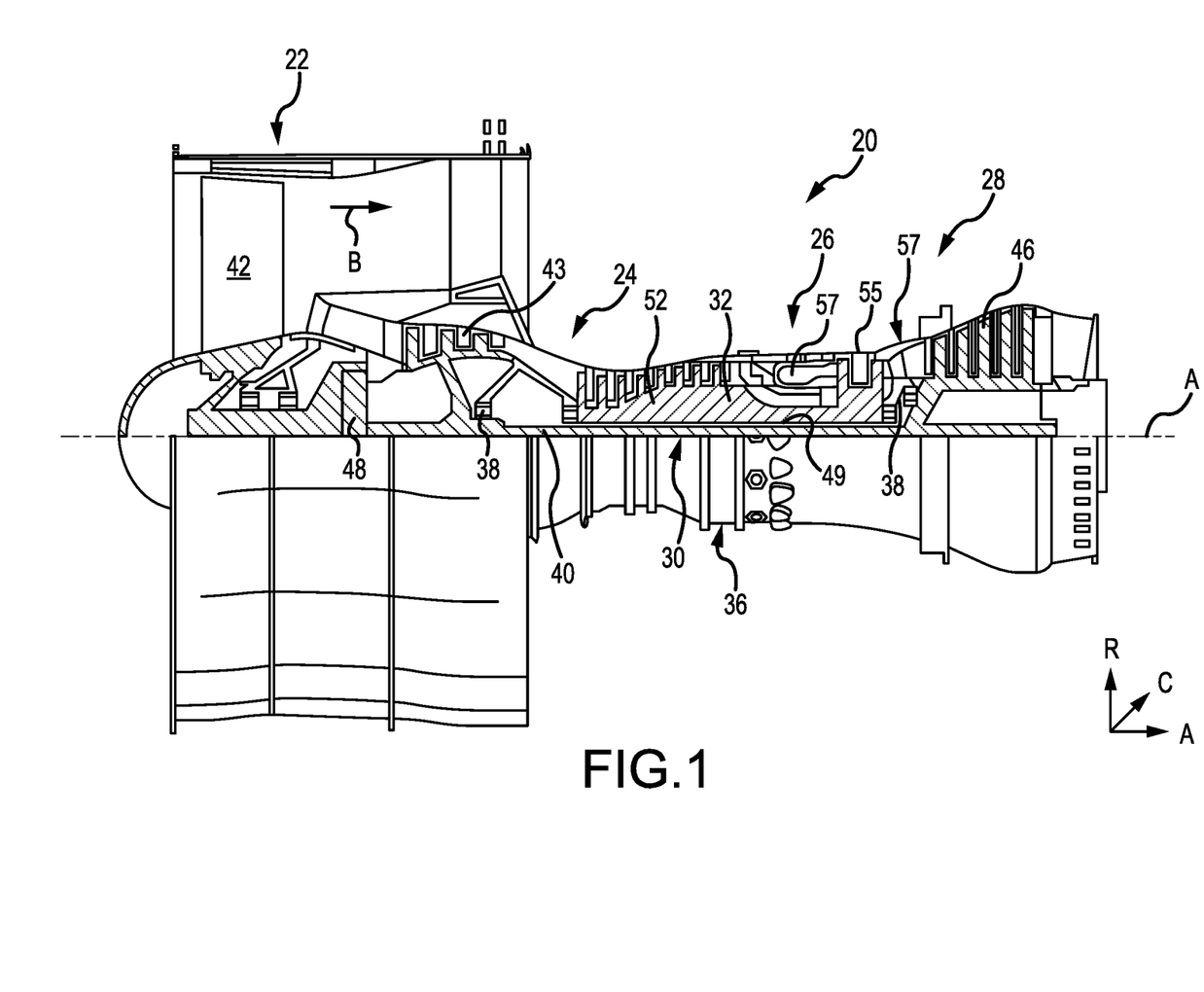
FIG. 1 shows a cross-section of a gas turbine engine, according to various embodiments.

According to various embodiments, and with reference to FIG. 1, a gas turbine engine 20 is schematically illustrated. According to various embodiments, gas turbine engine 20 may be a two-spool turbofan that generally incorporates a fan section 22, a compressor section 24, a combustor section 26 and a turbine section 28, for example. Alternative engines might include an augmentor section (not shown) among other systems or features, according to various embodiments. According to various embodiments, the fan section 22 drives air along a bypass flowpath B while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures, non-geared turbine engines, and land-based turbines, according to various embodiments.

According to various embodiments, gas turbine engine 20 may generally include a first spool 30 and a second spool 32 mounted for rotation about an engine central axis A relative to an engine static structure 36 via several bearing systems 38. It should be understood that various bearing systems 38 at various locations may alternatively or additionally be provided, according to various embodiments. According to various embodiments, the first spool 30 may generally include a first shaft 40 that interconnects a fan 42, a first compressor 43 and a first turbine 46. According to various embodiments, the first shaft 40 may be connected to the fan 42 through a gear assembly of a fan drive gear system 48 to drive the fan 42 at a lower speed than the first spool 30. According to various embodiments, the second spool 32 may include a second shaft 49 that interconnects a second compressor 52 and second turbine 55. According to various embodiments, the first spool 30 may run at a relatively lower pressure than the second spool 32. It is to be understood that "low pressure" and "high pressure" or variations thereof as used herein are relative terms indicating that the high pressure is greater than the low pressure. According to various embodiments, an annular combustor 57 may be arranged between the second compressor 52 and the second turbine 55. According to various embodiments, the first shaft 40 and the second shaft 49 may be concentric and rotate via bearing systems 38 about the engine central axis A which is collinear with their longitudinal axes, according to various embodiments.

According to various embodiments, the core airflow may be compressed by the first compressor 43 then the second compressor 52, mixed and burned with fuel in the annular combustor 57, then expanded over the second turbine 55 and first turbine 46. According to various embodiments, the first turbine 46 and the second turbine 55 may rotationally drive, respectively, the first spool 30 and the second spool 32 in response to the expansion. According to various embodiments, gas turbine engine 20 may be a high-bypass geared aircraft engine that has a bypass ratio that is greater than about six (6), with an example embodiment being greater than ten (10). According to various embodiments, the gear assembly of the fan drive gear system 48 may be an epicyclic gear train, such as a planetary gear system or other gear system, with a gear reduction ratio of greater than about 2.3:1 and the first turbine 46 may have a pressure ratio that is greater than about 5, for example. According to various embodiments, the first turbine 46 pressure ratio is pressure measured prior to inlet of first turbine 46 as related to the pressure at the outlet of the first turbine 46 prior to an exhaust nozzle. According to various embodiments, first turbine 46 may have a maximum rotor diameter and the fan 42 may have a fan diameter such that a ratio of the maximum rotor diameter divided by the fan diameter is less than 0.6. It should be understood, however, that the above parameters are only exemplary.

A significant amount of thrust may be provided by the bypass flow B due to the high bypass ratio. According to various embodiments, the fan section 22 of the gas turbine engine 20 may be designed for a particular flight condition—typically cruise at an airspeed of 0.8 Mach and altitude of 35,000 feet (10.67 km). The flight condition of 0.8 Mach and 35,000 feet (10.67 km) may be a condition at which an engine is operating at its best fuel consumption. To make an accurate comparison of fuel consumption between engines, fuel consumption is reduced to a common metric which is applicable to all types and sizes of turbojets and turbofans. The term that may be used to compare fuel consumption between engines is thrust specific fuel consumption, or TSFC. This is an engine's fuel consumption in pounds per hour divided by the net thrust. Stated another way, TSFC is the amount of fuel required to produce one pound of thrust. The TSFC unit is pounds per hour per pounds of thrust (lb/hr/lb Fn). When the reference is to a turbojet or turbofan engine, TSFC is often simply called specific fuel consumption, or SFC. "Low fan pressure ratio" is the pressure ratio across the fan blade alone, without a fan exit guide vane system. The low fan pressure ratio as disclosed herein according to one non-limiting embodiment is less than about 1.45. "Low corrected fan tip speed" is the actual fan tip speed in feet per second divided by an industry standard temperature correction of $[(T_{ram}° R)/(518.7° R)]^{0.5}$. The "Low corrected fan tip speed" as disclosed herein according to one non-limiting embodiment may be less than about 1150 feet per second (350 m/s).

Figure 2:
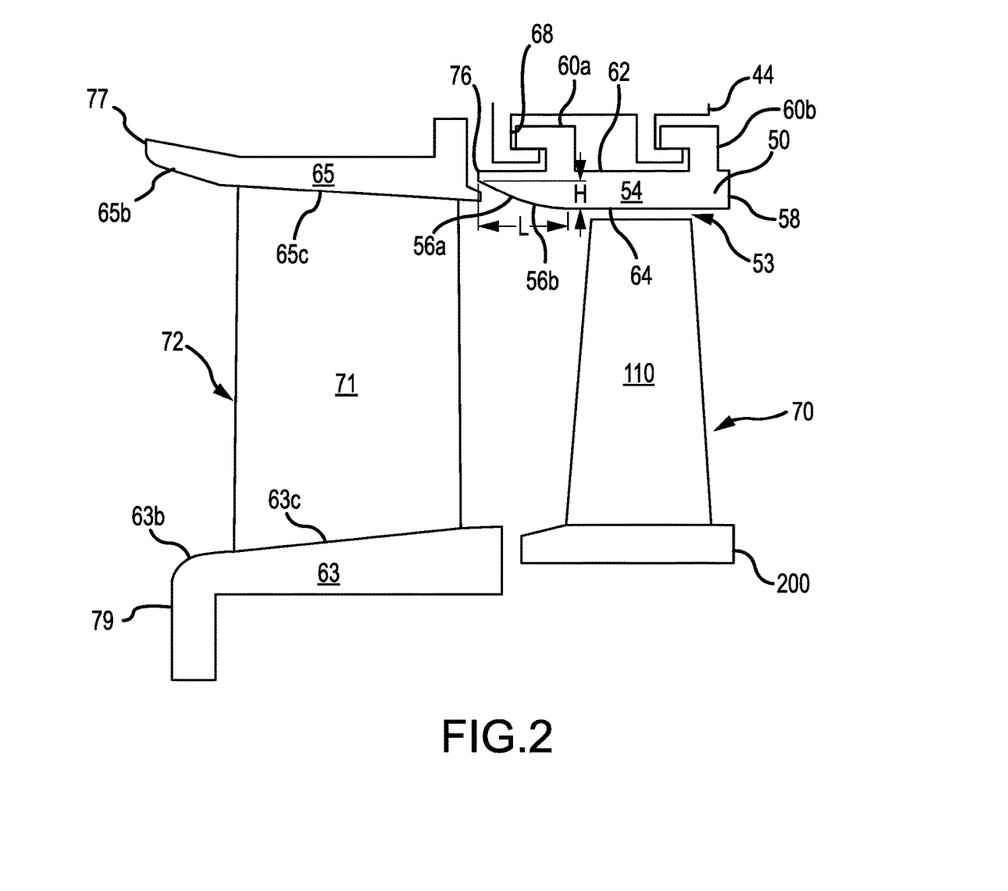
FIG. 2 schematically shows one of the turbine stages in the turbine section of the gas turbine engine of FIG. 1 (e.g., a first stage of a high pressure turbine (HPT)) and its associated array of blade outer air seal segments (a single blade outer air seal segment is shown), according to various embodiments.

Still referring to FIG. 1 and now to FIG. 2, according to various embodiments, each of the first and second compressors 43 and 52 and first and second turbines 46 and 55 in the gas turbine engine 20 comprises interspersed stages of rotor blades 70 and stator vanes 72. The rotor blades 70 rotate about the centerline with the associated shaft while the stator vanes 72 remain stationary about the centerline. The first and second compressors 43 and 52 in the gas turbine engine may each comprise one or more compressor stages. The first and second turbines 46 and 55 in the gas turbine engine 20 may each comprise one or more turbine stages. Each compressor stage and turbine stage may comprise multiple sets of rotating blades ("rotor blades") and stationary vanes ("stator vanes"). For example, FIG. 2 schematically shows, by example, a first turbine stage of the second turbine 55 (a high-pressure turbine (HPT)) in the turbine section of the gas turbine engine. Unless otherwise indicated, the term "blade stage" refers to at least one of a turbine stage or a compressor stage.

With continued reference to FIGS. 1 and 2, according to various embodiments, the depicted first turbine stage of the HPT comprises the rotor blade 70 and the stator vane 72. The stator vane 72 may have an inner stator vane platform 63 and an outer stator vane platform 65. The rotor blade 70 may comprise a blade airfoil section 110 and a platform 200, such as a rotor blade platform. A blade outer air seal (BOAS) segment 50 attached to an engine case structure 44 of the gas turbine engine 20 by a receiving portion 68 of the engine case structure 44. According to various embodiments, the BOAS segment 50 may be located within the turbine section 28 of the gas turbine engine 20, for example. According to various embodiments, the BOAS segment 50 faces rotor blade 70 to define a radial tip clearance 53 between the rotor blade 70 and the BOAS segment 50 (more particularly, between a proximate inner diameter flowpath surface 64 (FIG. 3) of the BOAS segment and the blade tip). The BOAS segment locally bounds the radially outboard extreme of the core flowpath through the gas turbine engine 20. Although only one BOAS segment 50 is shown in FIG. 2, the turbine stage comprises an associated array of blade outer air seal segments. A number of BOAS segments 50 may be arranged circumferentially about engine axis A to form a shroud, according to various embodiments. According to various embodiments, the BOAS assemblies 50 may alternatively be formed as a unitary BOAS structure, with the same features described herein.

Figure 3:
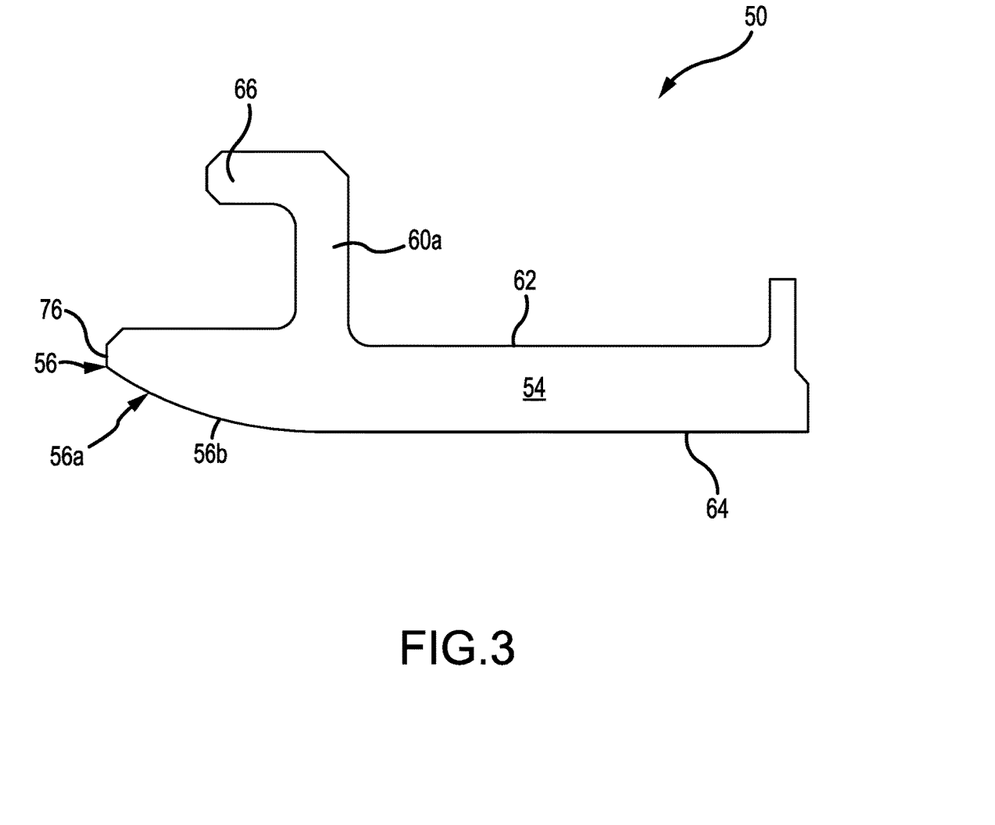
FIG. 3 shows a sectional view of another BOAS segment in isolation, the BOAS segment having an optimized leading edge geometry defined by a leading edge wall including an elongated transition portion extending between a leading edge of the BOAS segment and an inner diameter flowpath surface of the BOAS segment, according to various embodiments.

According to various embodiments, and with reference to FIGS. 2 and 3, the BOAS segment 50 may include a main body 54 that extends generally axially from a leading edge portion 56 to a trailing edge portion 58 and from a radially outward facing surface 62 at an outboard side of BOAS segment 50 to the inner diameter flowpath surface 64 at an inboard side of the BOAS segment 50. The leading edge portion 56 of the BOAS segment 50 includes a leading edge 76 and a leading edge wall 56a. In accordance with various embodiments, the leading edge wall 56a includes an elongated transition portion 56b that extends over an axial length between the leading edge 76 and the inner diameter flowpath surface 64 of the BOAS segment as hereinafter described and has multiple embodiments for cross-sectional profiles.

Still referring to FIGS. 2 and 3, and now to FIGS. 4 through 6D, the elongated transition portion 56b, which may have various configurations, defines an optimized leading edge geometry of the BOAS segment. According to various embodiments, the elongated transition portion 56b has an axial length (L) that is greater than a radial height (H), of up to one order of magnitude. The axial length of the elongated transition portion 56b is approximately three to approximately ten times the radial height of the elongated transition portion 56b. In various embodiments, the axial length may be defined as the length between a first tangency point 74 or the leading edge (face) 76 and the leading edge wall 56a and a second tangency point 78 and the inner diameter flowpath surface 64 and the radial height is defined as the radial distance between the inner diameter flowpath surface 64 and the leading edge wall.

Figure 4:
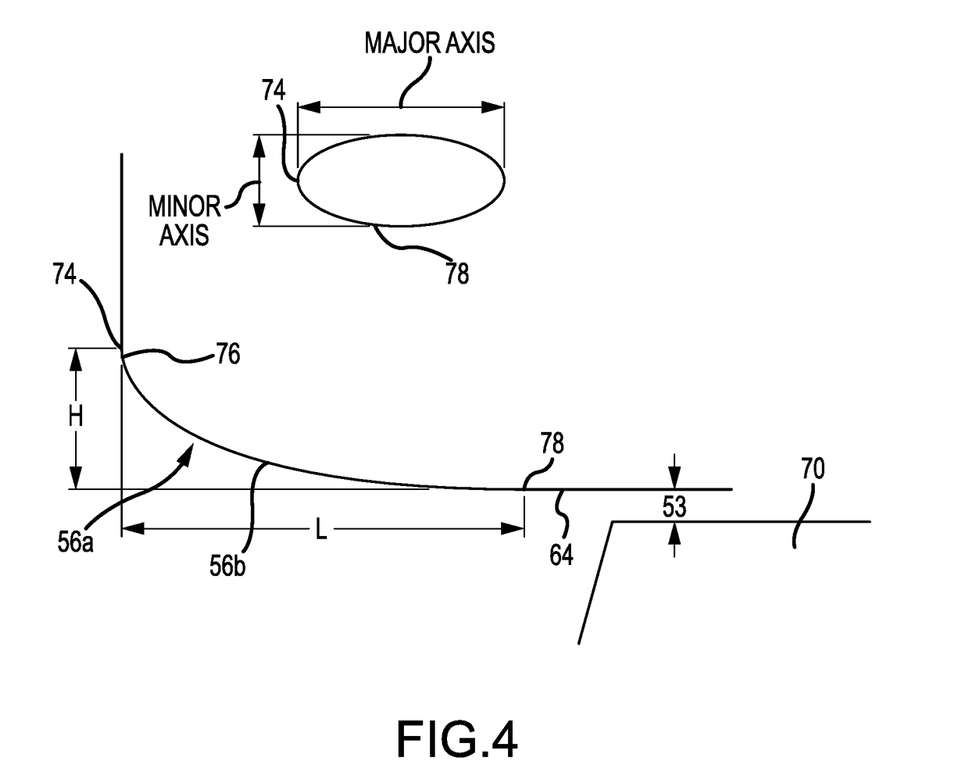
FIG. 4 is a schematic view of an elongated transition portion of an exemplary BOAS segment having an optimized leading edge geometry, the elongated transition portion configured as an ellipse, according to various embodiments.
Figure 6A:
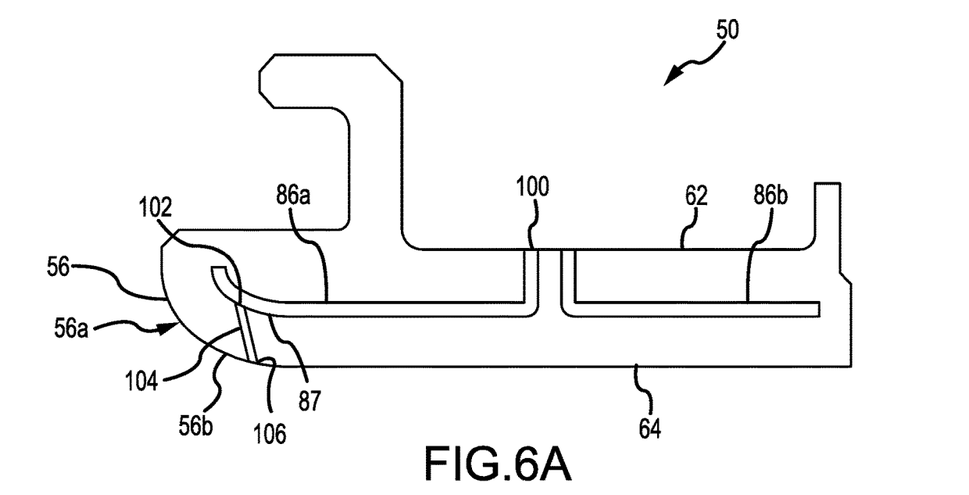
FIG. 6A through 6D shows a schematic sectional view of a leading edge portion of a BOAS segment having an axial flowing leading edge cooling passage with a leading edge periphery that generally conforms to an optimized leading edge geometry of the BOAS segment and cooling flow is in a forward direction toward the leading edge wall, according to various embodiments.
Figure 6B:
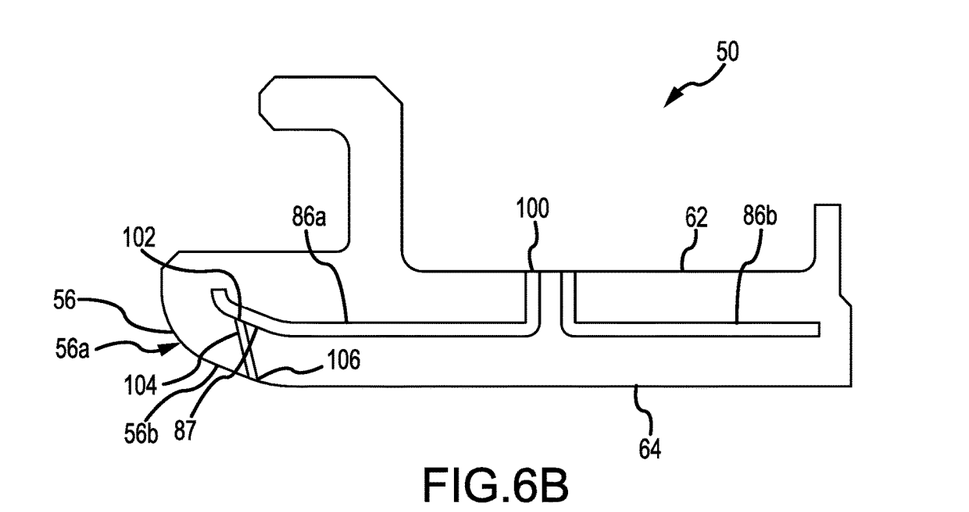
Figure 6C:
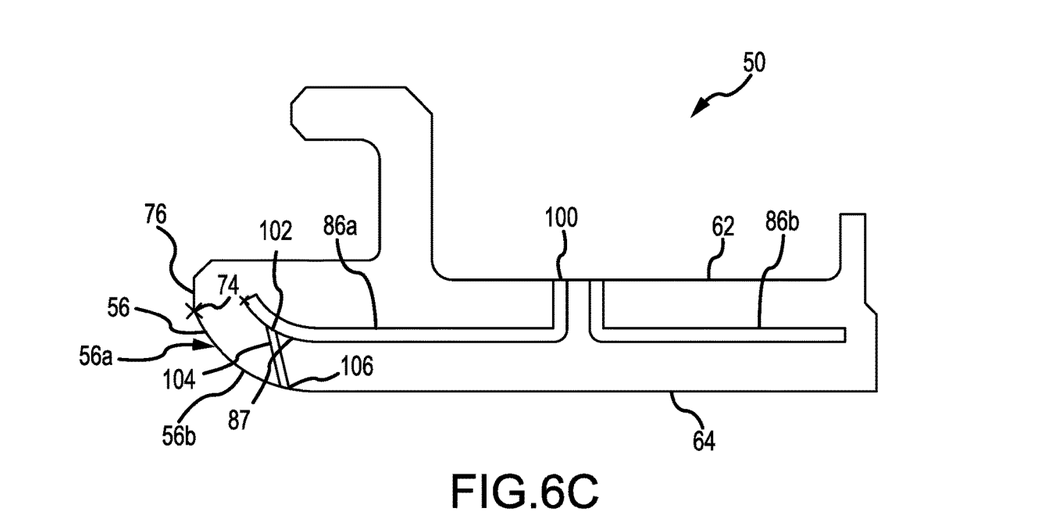
Figure 6D:
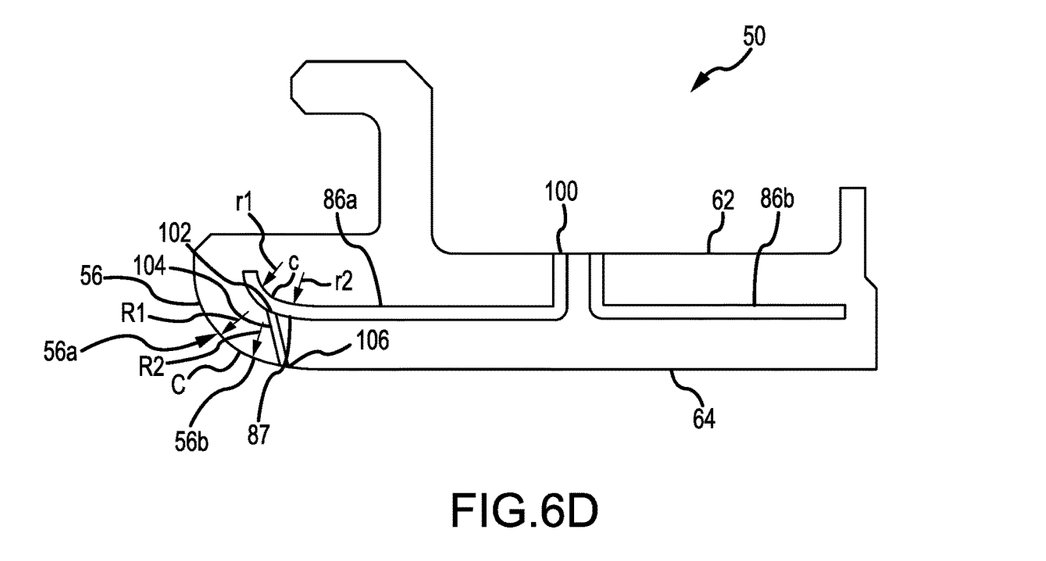

Still referring to FIGS. 2 through 4 and now specifically to FIG. 6A, according to various embodiments, the elongated transition portion 56b may be configured as an ellipse. The ellipse may have an ellipse ratio of greater than approximately 3, wherein the ellipse ratio is defined as a length of a major axis divided by the length of a minor axis. According to various embodiments, the elongated transition portion may be configured with a chamfer in combination with a radius (FIG. 6B). A degree of the chamfer is less than approximately 18 degrees referenced from the inner diameter flowpath surface 64. The elongated transition portion is configured as a chamfer with blended radii in FIG. 6B. FIG. 6C is a schematic view of the leading edge portion of an exemplary BOAS segment in the depicted embodiment illustrating that a transition of the elongated transition portion to the leading edge (face) of the BOAS segment may produce a corner X rather than a tangent. The elongated transition portion is configured as a short chamfer C between two radii (R1 and R2) in FIG. 6D. According to various embodiments, the elongated transition portion 56b of leading edge wall 56a, may improve gas flow transition across leading edge wall 56a, and to prevent a stagnation region at the leading edge portion 56 as well as providing other benefits. More specifically, the leading edge portion (more particularly, the elongated transition portion 56b) of the BOAS segment 50 (and other gas turbine engine components) has a geometry such that over an operational temperature range, thermal and/or mechanical deflections of a non-rotating structure (e.g., the upstream stator vane 72 depicted in FIG. 2) upstream of the BOAS array relative to thermal and/or mechanical deflections of the BOAS array cause relative movement of the non-rotating structure and the BOAS array to expose the leading edge portion of the BOAS to hot core flowpath air. The BOAS array may be radially deflected outboard of the upstream non-rotating structure (a "waterfall condition") or radially deflected inboard of the upstream non-rotating structure (a "dam condition"). As a result, a BOAS segment 50 with a conventional leading edge geometry (i.e., without the optimized leading edge geometry) is fully exposed to hot core flowpath air ("hot gas flow") and high heat transfer coefficients. By contrast, in accordance with various embodiments, the hot core flowpath air is transitioned from the upstream non-rotating structure (e.g., the upstream stator vane) to the BOAS segment with a reduced incidence angle (relative to the conventional leading edge geometry) accommodating an increased range of radial deflection.

For example, in the first stage of the high pressure turbine (HPT) (the designation "T1" referring to the first stage of the HPT) depicted in FIG. 2, a transition of the outer stator vane platform 65 to the leading edge of the BOAS is defined to yield a smooth core flowpath at steady state conditions for maximum efficiency, typically at cruise conditions. However, relative motion or shifts between the T1 stator vane and the T1 BOAS segment due to the varying thermal environment can result in the BOAS leading edge portion moving radially outboard of the outer stator vane platform 65 (outer diameter platform) of the T1 stator vane, creating an outward step in the hot core flowpath from the outer stator vane platform 65 and BOAS. Relative motion or shifts may also result in the BOAS leading edge portion moving radially inboard of the outer stator vane platform 65 (outer diameter platform) of the T1 stator vane, making the BOAS leading edge portion project into the hot core flowpath. As noted previously, this results in higher heat load for the BOAS leading edge portion, shortening its life and/or compelling additional cooling.

However, according to various embodiments, the elongated transition portion 56b may improve gas flow transition across the leading edge wall 56a, and may prevent a stagnation region at the leading edge 56. More particularly, various embodiments permit the transition from the upstream stator vane to the leading edge of the BOAS to be smoother and the leading edge portion less sensitive to being projected into the hot core flowpath air as a result of the relative movement/shifting of the BOAS segment and the surrounding static structure (e.g., the upstream stator vanes). As a result, various embodiments prolong BOAS life and/or tend to minimize cooling flow requirements for the BOAS segment/array, thereby maximizing turbine efficiency.

While various embodiments have been described to ease the transition between an upstream stator vane and an adjacent BOAS segment in a turbine stage, it is to be understood that various embodiments may be used to smooth the transition between adjacent non-rotating structures. As depicted in FIG. 2, the proximate flowpath surface for the BOAS leading edge 76 of the main body 54 of BOAS segment 50 is the inner diameter flowpath surface 64. Similar to elongated transition portion 56b of BOAS segment 50, the stator vane 72 has an elongated transition portion 65b on outer stator vane platform 65 that transitions from a static combustor panel (not shown) at an outer platform leading edge 77 to the proximate flowpath surface 65c, the boundary between outer stator vane platform 65 and an airfoil 71 of stator vane 72. Likewise, inner stator vane platform 63 includes an elongated transition portion 63b that extends from an inner platform leading edge 79 to a proximate flowpath surface 63c, the boundary between the elongated transition portion 63b and the airfoil 71 of stator vane 72. Hence, the "proximate flowpath surface" may be an inner flowpath surface or an outer flowpath surface.

In addition, while the first turbine stage of a HPT is depicted in FIG. 2, it is to be understood that various embodiments may be utilized for static gas turbine engine components in any turbine stage of the HPT or low-pressure turbine (LPT) (i.e., first turbine) and in any compressor stage of the high-pressure compressor (HPC) (i.e., second compressor) or the low-pressure compressor (LPC) (i.e., first compressor). While a BOAS segment having specially configured leading edge geometry for deflecting hot core flowpath air has been described in accordance with various embodiments, it is to be understood that other gas turbine engine components may benefit from an optimized leading edge geometry according to various embodiments. For example, mechanical and thermal deflections of a non-rotating structure adjacent to a gas turbine engine component may be such that relative movement exposes a leading edge portion of the gas turbine engine component to hot core flowpath air. The leading edge portion of the gas turbine engine component may be configured with the optimized leading edge geometry in accordance with various embodiments such that the hot core flowpath air is transitioned from the upstream non-rotating structure to the gas turbine engine component with reduced incidence angle that accommodates an increased range of relative radial deflections. Other exemplary gas turbine engine components that may benefit from various embodiments include, but are not limited to: combustor panels, vane platforms, BOAS, Mid-turbine frames, Transition Ducts, etc.

Referring again to FIGS. 2, 3, and 5, the BOAS segment 50 may include at least one leading attachment portion 60a (also referred to as "attachment portions 60a") disposed at or near the leading edge portion 56 and at least one trailing attachment portion 60b (also referred to as "attachment portions 60b") disposed at or near the trailing edge portion 58. Each of the attachment portions 60a, 60b may define a flange 66. Flange 66 of attachment portions 60a and/or 60b may extend in an axially aft direction. Flange 66 of attachment portions 60a and/or 60b may alternatively extend in an axially forward direction. Flange 66 of attachment portions 60a and/or 60b may alternatively extend in and/or out of the page. Each axially extending flange 66 corresponds to the receiving portion 68 of the engine case structure 44 to support and attach the BOAS segment 50. According to various embodiments, the attachment portions 60a may be circumferentially offset, circumferentially aligned, or a combination of both, from the attachment portions 60b in response to BOAS segment 50 parameters.

Referring again to FIGS. 6A through 6D, according to various embodiments, the leading edge wall 56a includes a cooling hole 104 having an outlet 106 (one shown) such that cooling air from a leading edge cooling passage 86a (herein described) is ejected from the outlets 106 at the leading edge of the BOAS segment to allow formation of a cooling film layer against the BOAS segment external wall surface. As a result, the leading edge of the BOAS segment 50 is substantially thermally protected. The cooling hole 104 is disposed in the elongated transition portion of the BOAS segment. There may be one or more than one cooling hole according to various embodiments. According to various embodiments, the one or more cooling holes comprise film cooling holes. The cooling holes 104 may have various hole geometries. Exemplary hole geometries include round cylindrical holes, cone holes, single lobe and/or multi-lobe shaped diffuser cooling holes. While cooling holes 104 in leading edge wall 56a have been described, it is to be understood that the leading edge wall 56a may include other than cooling holes having an outlet such that cooling air from the leading edge cooling passage 86a (herein described) may be ejected at the leading edge of the BOAS segment to allow formation of the cooling film layer against the BOAS segment external wall surface. For example, continuous, perforated, and/or segmented slot geometries may be used independently and/or in conjunction with one another to optimally tailor the leading edge circumferential flow distribution and film cooling effectiveness requirements, mitigating the non-uniform external heat flux distribution that occurs circumferentially along the BOAS leading edge. As used herein, the term "cooling hole", unless otherwise specified, refers to holes and/or slots, etc. having a suitable geometry for purposes as described herein.

Still referring to FIG. 6A through 6D, according to various embodiments, the BOAS segment 50 further comprises cooling passages 86a and 86b defined within the main body 54. According to various embodiments, cooling passage 86a comprises leading edge cooling passage 86a adjacent to the leading edge wall 56a. Aft cooling passage 86b is axially aligned aft of the leading edge cooling passage 86a. The aft cooling passages 86b may have various geometries.

According to various embodiments, as shown in FIGS. 6A through 6D, the leading edge cooling passage 86a has a leading edge periphery 87 that generally conforms to the elongated transition portion 56b of the leading edge wall 56a. According to various embodiments, the leading edge cooling passage 86a comprises an axial flow cooling passage as hereinafter described.

Figure 5:
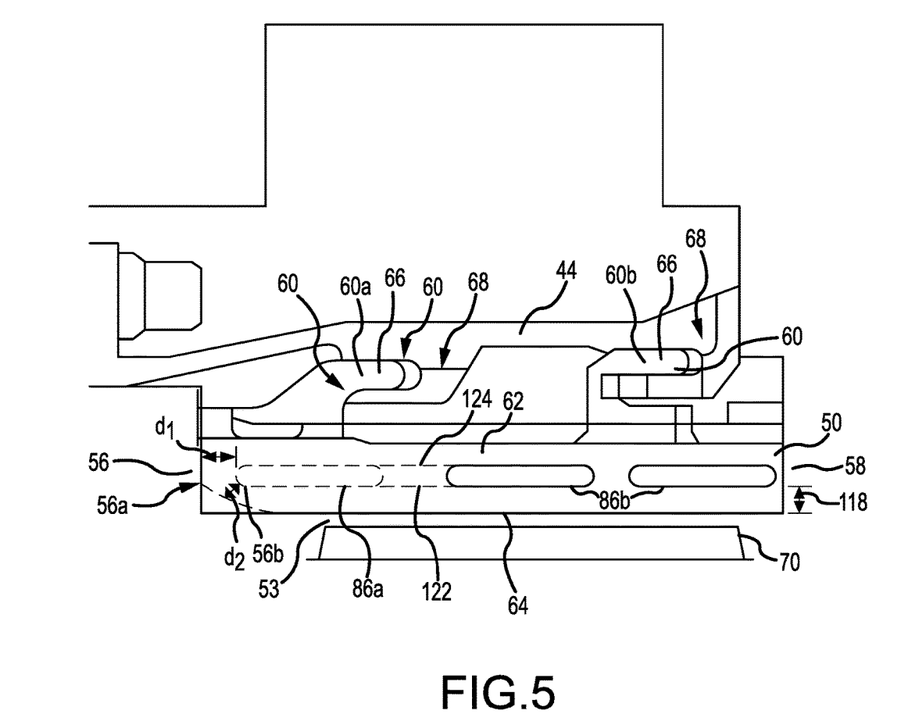
FIG. 5 shows a blade outer air seal (BOAS) segment attached to an engine case structure of the gas turbine engine of FIG. 1 and including a leading edge cooling passage, according to various embodiments.

According to various embodiments, the leading edge periphery 87 of the axial flow cooling passage is configured to substantially maintain a substantially uniform distance between the leading edge wall 56a and leading edge cooling passage 86a (i.e., a generally constant wall thickness between the leading edge periphery 87 and the leading edge wall 56a). A generally constant wall thickness is desired between the leading edge wall 56a and leading edge cooling passage 86a, which would otherwise be compromised if the leading edge cooling passage 86a were to conform with the geometry and alignment of the aft cooling passages 86b (FIG. 5). This is due to the fact that the elongated transition portion 56b creates a non-uniform distance distribution between the leading edge wall 56a and leading edge cooling passage 86a. Consequently, a distance d1 (with brief reference back to FIG. 5) between a portion of the leading edge wall 56a may be shortened to a distance d2 at a portion of the leading edge wall 56a having the transition portion 56b, as shown in FIG. 5. If d2 is too small, local wall thickness may decrease below a desirable minimum wall thickness. If d2 is too large, local wall thickness may exceed a desirable value. These are undesirable, as a reduced wall thickness may subject the BOAS segment 50 to casting defects, while a high wall thickness may adversely affect the local BOAS leading edge thermal cooling effectiveness of the BOAS segment 50. According to various embodiments, and with reference to FIGS. 6A through 6D, leading edge cooling passage 86a may be configured such that the leading edge periphery 87 generally conforms to the elongated transition portion of the BOAS segment to maintain a generally constant wall thickness between the leading edge periphery 87 and the leading edge wall 56a. For example, according to various embodiments, the leading edge periphery 87 may be configured as an ellipse (6A). The ellipse may have an ellipse ratio of greater than approximately 3, wherein the ellipse ratio is defined as a length of a major axis divided by the length of a minor axis. According to various embodiments, the elongated transition portion may be configured with a chamfer in combination with a radius (FIG. 6B). A degree of the chamfer is less than approximately 18 degrees, referenced from the inner diameter flowpath surface 64. According to various embodiments, the leading edge cooling passage 86a may be configured with facets to approximate a radius. The number and size of the facets are a balance between manufacturability and an attempt to minimize variations in wall thickness between the leading edge periphery 87 and the leading edge wall 56a. Faceting can be done in the axial and/or tangential directions. According to various embodiments, the leading edge periphery of the leading edge cooling passage may include a corner x such as shown in FIG. 6C or be configured as a short chamfer c between two radii (r1 and r2) (6D). The leading edge curvature of the leading edge cooling passage 86a enables the thermal resistance (wall thickness) between the leading edge 76 and the inner diameter flowpath surface 64 of the BOAS segment 50 in FIGS. 6A through 6D to be substantially constant or uniform by maintaining a local BOAS leading edge wall 56a thickness distribution that more optimally balances the external heat flux distribution in the axial direction by maintaining a better distribution of the leading edge 56 local relative wall thickness distribution adjacent to the leading edge cooling passage 86a and the inner diameter flowpath surface 64 of the BOAS segment by managing the local hot wall conduction thickness.

Still referring to FIGS. 6A through 6D, the leading edge cooling passage 86a extends from a leading edge cooling passage inlet 100 disposed through the radially outward facing surface 62 at an outboard side of BOAS segment 50 to a leading edge cooling passage outlet 102 in communication with the film cooling holes 104 in the BOAS leading edge wall. The leading edge cooling passage inlet 100 is disposed farther aft in the main body of the BOAS segment 50 than in a conventional BOAS segment 50, improving the architectural flexibility of the high-pressure turbine by allowing axial placement of the forward BOAS flange 66 not to be limited by requirements of the BOAS segment cooling passages. The leading edge cooling passage inlet 100 may be aft of the leading edge cooling passage outlet 102.

According to various embodiments, the leading edge cooling passages 86a configured as depicted in FIGS. 6A through 6D provide axial flow of the cooling air through the BOAS segment such that the cooling air flows axially in a forward direction from the leading edge cooling passage inlet 100 toward the leading edge 56 of the BOAS segment 50 rather than in the conventional circumferential direction. The cooling air exits the leading edge cooling passage outlet 102 that is adjacent to the leading edge wall of the BOAS segment. The leading edge cooling passage outlet 102 is in communication with the film cooling hole 104 in the leading edge wall of the BOAS segment, as previously noted. The axial flow of cooling air moves in a forward direction toward the leading edge of the BOAS segment 50 and provides both backside convective cooling as well as film cooling of the BOAS segment 50. This arrangement provides the highest thermal cooling efficiency as it utilizes the same cooling flow to provide both backside convective cooling and film cooling, thereby minimizing the flow requirements necessary to achieve the desired local metal temperatures to meet durability life requirements. More specifically, there is higher convective cooling and minimum film cooling near the leading edge cooling passage inlet 100. As the cooling air flows axially in the forward direction toward the BOAS leading edge 56, the cooling air is heated and has reduced effectiveness. Film cooling effectiveness toward the leading edge is at a maximum, at the location coincident with the film cooling hole ejection onto the BOAS leading edge 56 and attenuates with distance in the streamwise direction downstream (aft) along the inner diameter flowpath surface 64 of the BOAS segment 50.

The local leading edge curvature of leading edge cooling passage 86a also enables the film flow to be located more radially outboard along the BOAS leading edge, at a location that is desensitized to the relative radial deflection that occurs between the upstream non-rotating structure (e.g., an upstream stator vane) and the BOAS leading edge as previously described. The film cooling from the cooling holes may have a lower propensity for film blow-off and separation, as it is located in a more isolated flow region outboard toward the BOAS leading edge face 76. The resulting local film cooling effectiveness may perform better as it is not subject to the gas path circumferential pressure gradients induced by the vane trailing edge wake and an unsteady pressure field resulting from a blade tip wake as the flow passes adjacent to the radially inward facing surface 64 of the BOAS segment 50.

Figure 7:
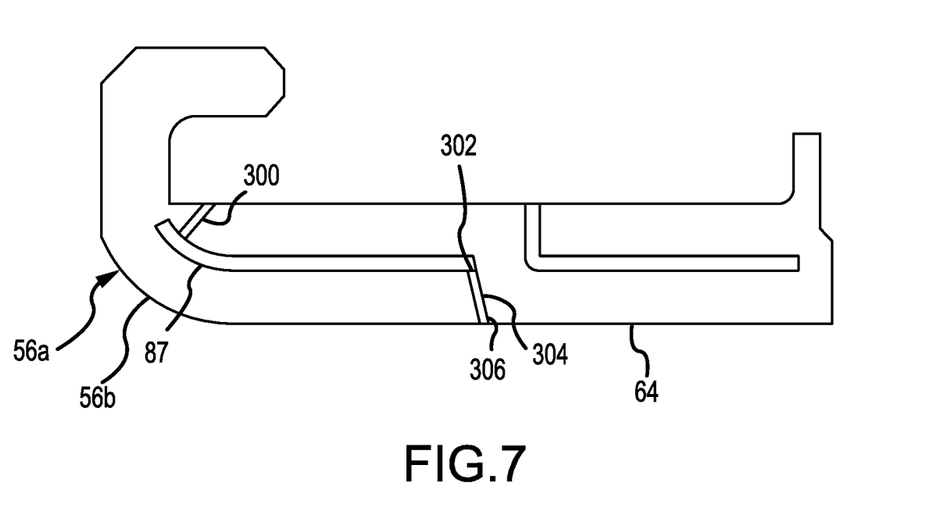
FIG. 7 shows a schematic sectional view of a leading edge portion of a BOAS segment having an axial flowing leading edge cooling passage the cooling flow may flow axially aft, from a leading edge cooling passage inlet at or near the leading edge to a leading edge cooling passage outlet toward the trailing edge, in accordance with various embodiments.

While cooling air flow axially in a forward direction from the leading edge cooling passage inlet 100 toward the leading edge 56 of the BOAS segment 50 where the cooling air exits the leading edge cooling passage outlet 102 that is adjacent to the leading edge wall of the BOAS segment has been described, it is to be understood that the cooling flow may flow axially aft, from a leading edge cooling passage inlet 300 at or near the leading edge 56 to a leading edge cooling passage outlet 302 toward the trailing edge as depicted in FIG. 7. According to various embodiments, as depicted in FIG. 7, the radially inward facing surface 64 includes a cooling hole 304 having an outlet 306 (one shown) such that cooling air from the leading edge cooling passage 86a (herein described) is ejected from the outlets 306 toward the trailing edge of the BOAS segment. As noted previously with respect to cooling holes 104, it is to be understood that cooling holes 304 may have various hole geometries. Exemplary hole geometries include round cylindrical holes, cone holes, single lobe and/or multi-lobe shaped diffuser cooling holes. While cooling holes 304 have been described, it is to be understood that the radially inward facing surface 64 may include other than cooling holes having an outlet such that cooling air from the leading edge cooling passage 86a may be ejected from the outlets 306 toward the trailing edge of the BOAS segment. For example, continuous, perforated, and/or segmented slot geometries may be used independently and/or in conjunction with one another to optimally tailor the leading edge circumferential flow distribution and film cooling effectiveness requirements, mitigating the non-uniform external heat flux distribution that occurs circumferentially along the BOAS leading edge.

Referring again to FIG. 5, according to various embodiments, the BOAS segment 50 may be fabricated from a material such as an austenitic nickel-chromium-based alloy, though other types of material may be used, according to various embodiments. For example, the BOAS segment 50 may be fabricated from silica, alumina, or combinations thereof as well from refractory metals and their alloys. The BOAS segment 50 may be manufactured by additive manufacturing techniques such as direct metal laser sintering (DMLS) or other manufacturing techniques.

According to various embodiments, a distance 118 exists between a floor line 122 of the plurality of cooling passages 86a and the radially inward facing surface 64. According to various embodiments, the BOAS segment 50 may include a thermal barrier coating (e.g., a metallic or based coating, multiple layers of coating such as a thermal layer and a bond layer, etc.) disposed on the radially inward facing surface 64 of the main body portion 54, according to various embodiments.

During gas turbine engine 20 (FIG. 1) operation, the BOAS segment 50 is subjected to different thermal loads and environmental conditions. The BOAS segment 50 is in fluid communication with an airflow source, such as an upstream compressor in the compressor section 24 or other source, which provides cooling airflow, such as bleed compressor air. This provides varying levels of cooling to different areas of the BOAS segment 50 and effectively communicates thermal energy away from the BOAS segment 50 and the tip of the rotating rotor blade 70. As noted previously, in accordance with various embodiments, the leading edge 56 of the BOAS segment 50 now benefits from film cooling realized by the axial flow of the cooling air toward the BOAS leading edge 56. As a result, various embodiments minimize cooling flow requirements for BOAS, thereby maximizing turbine efficiency. Parasitic cooling flow is minimized and the uniform wall thickness improves oxidation and thermal life. While a BOAS segment having a specially configured axial flow cooling passage geometry has been described in accordance with various embodiments, it is to be understood that other gas turbine engine components may benefit from a specially configured axial flow cooling passage geometry according to various embodiments.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine component comprising:
   a main body having a leading edge and a leading edge wall including an elongated transition portion extending between the leading edge and a proximate flowpath surface of the main body and a cooling hole; and
   a leading edge cooling passage comprising an axial flow cooling passage defined within the main body, the leading edge cooling passage adjacent to the leading edge wall and having a leading edge periphery that generally conforms to the elongated transition portion of the leading edge wall, wherein the leading edge periphery comprises an ellipse, wherein the elongated transition portion comprises an ellipse.

2. The gas turbine engine component of claim 1, wherein the leading edge cooling passage has a leading edge cooling passage inlet aft of a leading edge cooling passage outlet, the leading edge cooling passage outlet communicating with the cooling hole, wherein a cooling flow through the gas turbine engine component comprises an axial cooling flow in a forward direction toward the leading edge wall.

3. The gas turbine engine component of claim 1, wherein the cooling hole comprises a film cooling hole that is disposed in the elongated transition portion of the leading edge wall.

4. The gas turbine engine component of claim 3, wherein the leading edge cooling passage outlet communicating with the film cooling hole provides film cooling of the leading edge portion of the main body.

5. The gas turbine engine component of claim 4, wherein convective cooling occurs within the leading edge cooling passage, in addition to the film cooling.

6. The gas turbine engine component of claim 1, wherein the leading edge cooling passage has a leading edge cooling passage inlet forward of a leading edge cooling passage outlet, wherein a cooling flow through the gas turbine engine component comprises an axial cooling flow in an aft direction away from the leading edge wall.

7. The gas turbine engine component of claim 1, wherein the leading edge periphery is configured to substantially maintain a constant distance between the leading edge wall and the leading edge cooling passage.

8. The gas turbine engine component of claim 1, wherein the main body and leading edge cooling passage are that of a blade outer air seal (BOAS) segment comprising the gas turbine engine component.

9. A blade outer air seal segment for a gas turbine engine comprising:
a main body that extends generally axially, with respect to a central axis, from a leading edge portion of the main body to a trailing edge portion of the main body, wherein the leading edge portion includes a leading edge wall having an elongated transition portion and a cooling hole; and
a leading edge cooling passage comprising an axial flow cooling passage defined within the main body, the leading edge cooling passage adjacent to the leading edge wall and having a leading edge periphery that generally conforms to the elongated transition portion of the leading edge wall, wherein the leading edge periphery comprises an ellipse, wherein the elongated transition portion comprises an ellipse.

10. The blade outer air seal segment of claim 9, wherein the leading edge cooling passage has a leading edge cooling passage inlet aft of a leading edge cooling passage outlet, the leading edge cooling passage outlet communicating with the cooling hole and wherein a cooling flow through the blade outer air seal segment comprises an axial cooling flow in a forward direction toward the leading edge wall.

11. The blade outer air seal segment of claim 10, wherein the cooling hole comprises a film cooling hole that is disposed in the elongated transition portion of the leading edge wall.

12. The blade outer air seal segment of claim 10, wherein the leading edge cooling passage outlet communicating with the cooling hole provides film cooling of the leading edge portion of the main body.

13. The blade outer air seal segment of claim 12, wherein convective cooling occurs within the blade outer air seal segment, in addition to the film cooling.

14. The blade outer air seal segment of claim 9, wherein the leading edge cooling passage has a leading edge cooling passage inlet forward of a leading edge cooling passage outlet, wherein a cooling flow through a gas turbine engine component comprises an axial cooling flow in an aft direction away from the leading edge wall.

15. A gas turbine engine comprising:
a blade stage; and
a circumferential array of blade outer air seal segments in the blade stage, a blade outer air seal (BOAS) segment comprising:
a main body that extends generally axially with respect to a central axis, from a leading edge portion of the main body to a trailing edge portion of the main body, wherein the leading edge portion includes a film cooling hole, a leading edge and a leading edge wall having an elongated transition portion extending between the leading edge and an inner diameter flowpath surface of the main body; and
a leading edge cooling passage comprising an axial flow cooling passage defined within the main body, the leading edge cooling passage adjacent to the leading edge wall and having a leading edge periphery that generally conforms to the elongated transition portion of the leading edge wall, wherein the leading edge periphery comprises an ellipse, wherein the elongated transition portion comprises an ellipse.

16. The gas turbine engine of claim 15, wherein the leading edge cooling passage has a leading edge cooling passage inlet aft of a leading edge cooling passage outlet, the leading edge cooling passage outlet communicating with the film cooling hole and wherein a cooling flow through the BOAS segment comprises an axial cooling flow in a forward direction toward the leading edge wall.

17. The gas turbine engine of claim 15, wherein the film cooling hole is disposed in the elongated transition portion of the leading edge wall.

18. The gas turbine engine of claim 16, wherein the leading edge cooling passage outlet communicating with the film cooling hole provides film cooling of the leading edge portion of the main body.

19. The gas turbine engine of claim 18, wherein convective cooling occurs within the BOAS segment, in addition to the film cooling.

20. The gas turbine engine of claim 15, wherein the leading edge cooling passage has a leading edge cooling passage inlet forward of a leading edge cooling passage outlet, wherein a cooling flow through a gas turbine engine component comprises an axial cooling flow in an aft direction away from the leading edge wall.

* * * * *